(12) United States Patent
Kallahalla et al.

(10) Patent No.: US 7,171,557 B2
(45) Date of Patent: Jan. 30, 2007

(54) SYSTEM FOR OPTIMIZED KEY MANAGEMENT WITH FILE GROUPS

(75) Inventors: Mahesh Kallahalla, Palo Alto, CA (US); Erik Riedel, San Francisco, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 09/984,928

(22) Filed: Oct. 31, 2001

(65) Prior Publication Data

US 2003/0081784 A1   May 1, 2003

(51) Int. Cl.
*H04L 9/00* (2006.01)
(52) U.S. Cl. .................. 713/165; 713/166; 380/277
(58) Field of Classification Search ............... 380/277; 713/165, 166
See application file for complete search history.

(56) References Cited

U.S. PATENT DOCUMENTS

| | | | | |
|---|---|---|---|---|
| 5,495,533 | A  * | 2/1996  | Linehan et al. | 713/155 |
| 5,548,648 | A  * | 8/1996  | Yorke-Smith | 713/193 |
| 5,584,023 | A  * | 12/1996 | Hsu | 707/204 |
| 5,953,419 | A  * | 9/1999  | Lohstroh et al. | 713/165 |
| 6,577,735 | B1 * | 6/2003  | Bharat | 380/286 |
| 6,662,198 | B2 * | 12/2003 | Satyanarayanan et al. | 707/204 |
| 2002/0166053 | A1* | 11/2002 | Wilson | 713/189 |
| 2003/0005300 | A1* | 1/2003  | Noble et al. | 713/172 |
| 2003/0037248 | A1* | 2/2003  | Launchbury et al. | 713/193 |
| 2005/0108240 | A1* | 5/2005  | Bolosky et al. | 707/9 |

OTHER PUBLICATIONS

Fu, Kevin et al., "Fast and Secure Distributed Read-Only File System", MIT Laboratory for Computer Science, 545 Technology Square, Cambridge, MA 02139, http://www.fs.net/; Date unknown, Pages not numbered.
Blaze, Matt, "A Cryptographic File System for Unix", 1st Conf.-Computer & Comm. Security '93-Nov. 1993—VA, USA, pp. 9-16.

* cited by examiner

*Primary Examiner*—Ayaz Sheikh
*Assistant Examiner*—Kaveh Abrishamkar

(57) ABSTRACT

A group manager module may provide the capability to segregate or associate files into file encryption groups. A file may be placed into a file encryption group based on the attributes of the file. The attributes may be characteristics/parameters that describe who has access to a file such as UNIX permission/mode bits (group-read/write/executable bit, owner-read/write/executable bits, users-read/write/executable bits) or other system for access control lists (ACLs). Once associated with a file encryption group, the file may be encrypted with the encryption (or write) key of the selected file encryption group, and thus, decrypted with the decryption (or read) key of the file encryption group. A user may have membership into multiple file encryption groups as long as the user possesses the appropriate read/write key pairs. Membership of a file in a file encryption group is determined automatically by the system based on the permission attributes assigned by the system—groups are not explicitly created by administrators or other centralized authority. It is not users that belong to groups based on their access rights, but files which belong to groups based on their permission attributes.

17 Claims, 6 Drawing Sheets

SYSTEM FOR OPTIMIZED KEY MANAGEMENT WITH FILE GROUPS

RELATED APPLICATIONS

The following commonly assigned applications, filed concurrently, may contain some common disclosure and may relate to the present invention. Thus, the following applications are hereby incorporated by reference:

U.S. patent application Ser. No. 09/984,927 entitled "SYSTEM FOR ENABLING LAZY-REVOCATION THROUGH RECURSIVE KEY GENERATION"

U.S. patent application Ser. No. 09/984,936 entitled "SYSTEM FOR ENCRYPTED FILE STORAGE OPTIMIZATION VIA DIFFERENTIATED KEY SIZES"; and U.S. patent application Ser. No. 09/984,926 entitled "SYSTEM FOR ENSURING DATA PRIVACY AND USER DIFFERENTIATION IN A DISTRIBUTED FILE SYSTEM".

FIELD OF THE INVENTION

This invention relates generally to file system management. In particular, the invention relates to optimizing key management in a cryptographic file system.

DESCRIPTION OF THE RELATED ART

The typical file system (e.g., MICROSOFT WINDOWS, traditional UNIX, etc.) does not encrypt the data stored on the underlying data storage devices. Instead, the typical file system protects data as it is transferred between user and server. In an untrusted file server environment, the data storage devices are under the control of a third party who may not be fully trusted to protect the data or prevent malicious users from accessing, copying or using the stored data.

One solution to protecting data is for a user to encrypt the data prior to transfer to the data storage device. However, the user has the responsibility for encrypting/decrypting data and sharing the file with other users. Users may find that the personal management of the security for the file may become tiresome.

Another solution for a cryptographic file system is described in "Fast and Secure Distributed Read-Only File System," OSDI, October 2000 written by K. Fu, M. Kaashoek and D. Mazieres, which is hereby incorporated by reference in its entirety. In this cryptographic file system, a user decides on the granularity at which the keys are to be aggregated. Unfortunately, this forces a client to manage a large number of keys and the mapping of the keys to the files, which makes it difficult for a user to share files difficult. As a result, this cryptographic file system deters people from regularly using the system.

Yet another solution for a cryptographic file system is described in "A Cryptographic File System for UNIX," Proceedings of 1st ACM Conference on Communications and Computing Security, 1993, written by M. Blaze, which is incorporated by reference and in its entirety. In this cryptographic file system, the file system defines the groups that are used to determine a client's (or user) access control permissions. In particular, an entire directory that is to be protected is encrypted and its access permissions are determined by the UNIX permissions of the file representing that directory. However, this example of a cryptographic file system has several drawbacks. For instance, the system administrator decides the groups defined by the file system. As a result, users tend to gravitate towards making all files either universally accessible (public) or completely closed (private), effectively voiding the usefulness of the file system.

SUMMARY OF THE INVENTION

In accordance with the principles of the present invention, one aspect of the invention pertains to a method of implementing a file system. The method includes creating a plurality of file encryption groups from a plurality of files based on common attributes of the plurality of files and associating each file encryption group of the plurality of file encryption groups with a respective key. The method also includes accessing one file encryption group by utilizing one respective key.

Another aspect of the present invention relates to a system for implementing a file system. The system includes at least one processor, a memory coupled to at least one processor, and a group manager module. The group manager module resides in the memory and is executed by at least one processor. The group manager module is configured to create a plurality of file encryption groups from a plurality of files based on common attributes of the plurality of files and is also configured to associate each file encryption group of the plurality of file encryption groups with a respective key. The group manager module is further configured to access one file encryption group by utilizing one respective key.

Another aspect of the present invention pertains to an apparatus for implementing a file system. The apparatus includes an interface configured to communicate with a storage device, an encryption/decryption module, and a manager module. The manager module is configured to associate a subplurality of files of a plurality of files stored on the storage device into a file group based on common attributes of the subplurality of files and encrypting the subplurality of files with one encryption key of the plurality of encryption keys by utilizing the encryption/decryption module.

BRIEF DESCRIPTION OF THE DRAWINGS

Various features and aspects of the present invention can be more fully appreciated as the same become better understood with reference to the following detailed description of the present invention when considered in connection with the accompanying drawings, in which.

DETAILED DESCRIPTION OF A PREFERRED EMBODIMENT

Figure 1:
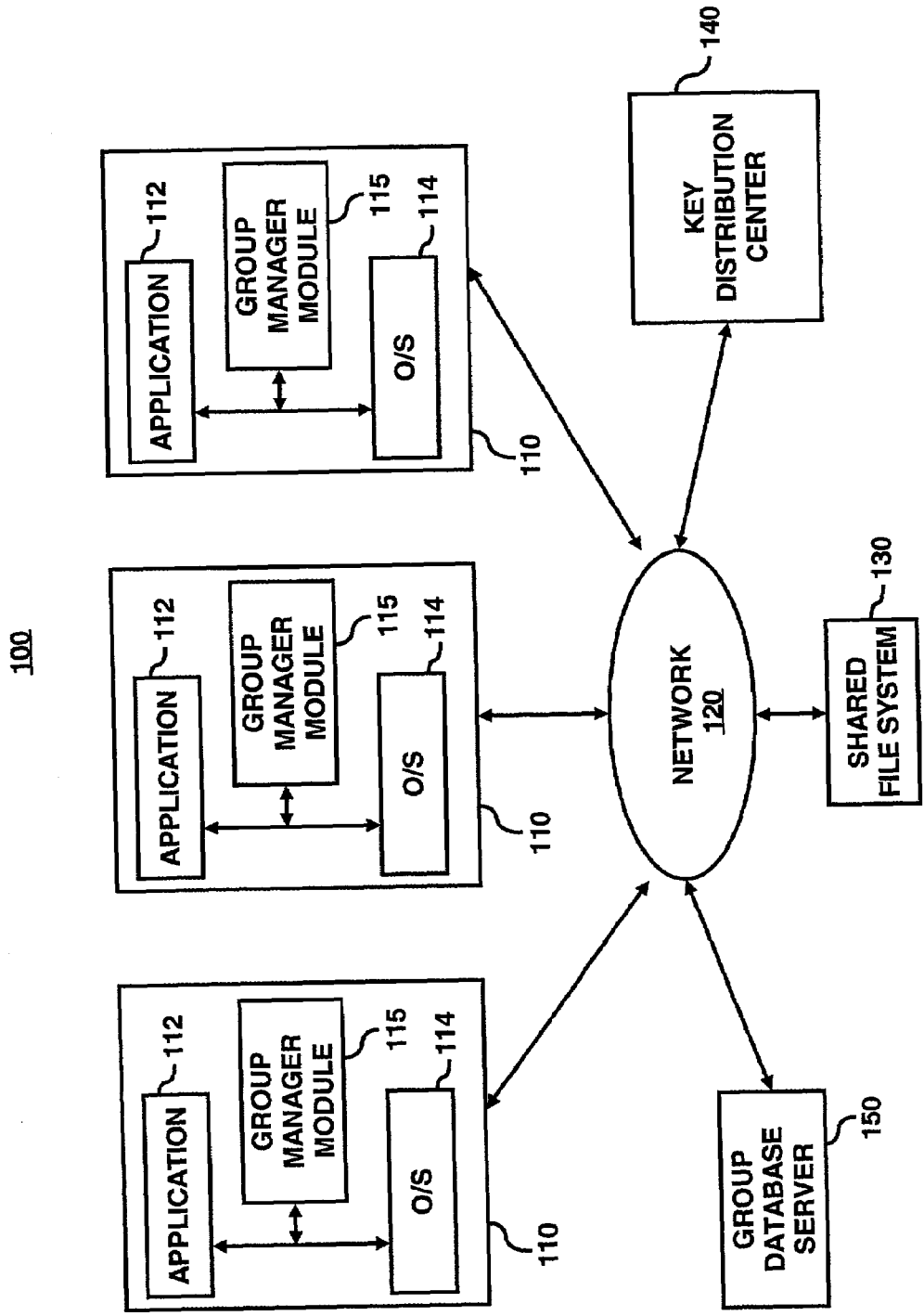
FIG. 1 illustrates block diagram of a system utilizing an embodiment of a group manager module in accordance with the principles of the present invention.

For simplicity and illustrative purposes, the principles of the present invention are described by referring mainly to an exemplary embodiment of a group manager module. However, one of ordinary skill in the art would readily recognize that the same principles are equally applicable to, and can be implemented in, all types of systems requiring file management, and that any such variation do not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a group manager module may be utilized to manage files in a shared file system. In particular, a group manager module may provide the capability to segregate or associate files into file encryption groups. A file may be placed into a file encryption group based on the common attributes of the file with the other member of the file encryption group. The attributes may be characteristics (or parameters) that describe who has access to a file such as UNIX permission/mode bits, access control lists or other similar characteristics. Once associated with a file encryption group, the file may be encrypted with the associated cryptographic key (e.g., a symmetric encryption key, an asymmetric read/write key pair, or other similar key) the selected file encryption group, and thus, decrypted with the associated cryptographic key (e.g., a symmetric encryption key, an asymmetric read/write key pair, or other similar key) of the selected file encryption group. A user may have membership into multiple file encryption groups as long as the user possesses the appropriate cryptographic keys, whereby group membership is indirectly determined through possession of a cryptographic key, rather than being explicitly maintained in some central database.

In one aspect of the present invention, a group manager module may be configured to determine whether to generate cryptographic keys for a new file group in response to a data (or file) creation event, i.e., file being created. The operating system may assign a default set of attributes (e.g., mode bits, access control lists) based on the attributes of the user (e.g., "user group rw-r-r-". The group manager may be configured to determine a cryptographic key based on the default set of attributes. The group manager module may encrypt the file with the selected cryptographic key for storage on a shared file system. The encrypted file may be then associated with the file encryption group of the selected cryptographic key, i.e., the files that have been encrypted with the selected cryptographic key.

In yet another aspect of the present invention, the cryptographic key associated with a selected file encryption group may be a symmetric key or an asymmetric read/write key pair, which is disclosed in more detail in a commonly assigned and concurrently file U.S. patent application Ser. No. 09/984,926 entitled "SYSTEM FOR ENSURING DATA PRIVACY AND USER DIFFERENTIATION IN A DISTRIBUTED FILE SYSTEM" and is hereby incorporated by reference in its entirety. In particular, if the associated cryptographic key of a file encryption group is a symmetric key, the symmetric key may be randomly generated. If the associated cryptographic key of a file encryption group is an asymmetric read/write key pair, the read/write key pair may be generated using a symmetric crypto-algorithm such as Rivest-Shamir-Adelman (RSA) algorithm, which is discussed in U.S. Pat. No.: 4,405,829 and is hereby incorporated by reference in its entirety). The read/write key pair may respectively decrypt/encrypt the file.

In another aspect, the group manager module may be also configured to detect a change in the attributes of an encrypted file. An example of a change in the attributes may be an owner of the file executing a UNIX command such as 'chmod', 'chown', 'chgrp', or other similar commands. The group manager module may be further configured to determine whether the changed attributes may create a new file encryption group. If the changed attributes do not create a new file encryption group, the group manager module may be further configured to search a file encryption group table for the corresponding cryptographic key of the existing file encryption group as well as a current cryptographic key for the encrypted file. The group manager module may be further configured to decrypt the encrypted file with the current cryptographic key and re-encrypt the file with the corresponding cryptographic key of the existing file encryption group. Accordingly, selected files may switch file encryption data groups.

Otherwise, if the attribute change creates a new file encryption group, the group manager module may be configured to generate a cryptographic key (e.g., a symmetric key, an asymmetric read/write key pair, etc.) for the new file encryption group. The group manager module may be also configured to encrypt the data with the new cryptographic key and store the encrypted data on a shared file system. The group manager module may be further configured to update the file encryption group table.

Accordingly, by organizing files into file encryption group where each group is indexed by a respective cryptographic key, users may be benefited by a minimization of cryptographic key for files. Files that are commonly accessed by a group of users may share the same cryptographic key as opposed to some conventional systems where each file would have its own cryptographic key. This sharing of keys is done by automatically matching the sharing structure of the system—including owners, groups, and mode bits—it does not require any centralized authority or administrator to create new groups. For example, a file with "rw-" permissions for a particular UNIX group will be in a different file encryption group than a file with only "r-" permissions for that UNIX group. This provides a more natural grouping of files and superior protection. Note that read or write permissions to access a file are determined by other mechanisms-either the underlying UNIX system, or a scheme that differentiates based on the cryptographic keys themselves (see U.S. patent application Ser. No. 09/984,926 entitled "SYSTEM FOR ENSURING DATA PRIVACY AND USER DIFFERENTIATION IN A DISTRIBUTED FILE SYSTEM", and this differentiation based on mode bits is done solely to group files with similar patterns. It is not part of the enforcement mechanism, as in existing systems.

FIG. 1 illustrates block diagram of a system 100 where an embodiment of the present invention may be practiced. As shown in FIG. 1, the system 100 includes user stations 110, a network 120, and a shared file system 130.

The user stations 110 of the system 100 may be configured to provide access to computer software applications and/or data. The user stations 110 may be implemented by a personal computer, a laptop computer, a workstation, a portable wireless device, and other similar computing devices.

Each user station 110 may include an application 112, an operating system 114 and a group manager module 115. Although, for illustrative purposes only, FIG. 1 illustrates an exemplary embodiment of the architecture for the user station 110, it should be readily apparent to those of ordinary skill in the art that FIG. 1 represents a generalized schematic illustration of the user station 110 and that other components may be added or existing components may be removed without departing from the spirit or scope of the present invention.

The application 112 may be software computer program that is executed on the user station 110. The application 112 may be a word processing program, a spreadsheet program or any other type of program that generates files to be stored in the shared file system 130. The application 112 may be interfaced with the operating system 114 through an application program interface (API, not shown). The operating system 114 may be configured to manage the software applications, data and respective hardware components (e.g., displays, disk drives, etc.) of the user station 110. The operating system 114 may be implemented by MICROSOFT WINDOWS family of operating systems, UNIX, HEWLETT-PACKARD HP-UX, LINUX, RIM OS, and other similar operating systems.

The operating system 114 of the user station 110 may be configured to interface with the group manager module 115. The group manager module 115 may be configured to provide the capability of grouping files into file encryption groups based on a set of attributes associated with the file. The attributes may be characteristics/parameters that describe who has access to a file such as UNIX permission/ mode bits (group-read/write/executable bit, owner-read/ write/executable bits, users-read/write/executable bits). The group manager module 115 may be implemented as a software program, a utility, a subroutine, or other similar programming entity. In this respect, the group manager module 115 may be programmed using software languages such as C, C++, JAVA, etc. Alternatively, the group manager module 115 may be implemented as an electronic device utilizing an application specific integrated circuit, discrete components, solid-state components or combination thereof.

The user stations 110 may be further configured to interface with the network 120 through a respective network interface (not shown). The network 120 may be configured to provide a communication channel between each user station 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX, IEEE 801.11b, and other similar network protocols.

The shared file system 130 may be configured to provide storage of data and/or software applications for the system 100. The shared file system 130 may be a network accessible disk drive and/or array of disks.

Optionally, the system 100 may include a key distribution center 140 and a group database server 150. The key distribution center 140 may be configured to provide a secure method of transferring encryption/decryption keys within the system 100. The group database server 150 may be configured to provide central access to the user of the system 100 for information related to file encryption groups. In one contemplated embodiment, the group database server 150 may store a file encryption group table that is configured to provide a listing of encryption keys (or pointers to encryption keys) and respective file encryption group. The file encryption group may be defined in terms of the common attributes of the files contained in the file encryption group, for example, as shown in the following TABLE I:

TABLE I

| owner | group | mode bits | key |
|---|---|---|---|
| User1 | Group I | rw-r—r-- | K1 |
| User1 | Group I | rw-rw-r-- | K2 |
| User2 | Group I | rw-rw-r-- | K3 |
| User2 | Group II | rwxrwxr-x | K4 |

In accordance with one aspect of the present invention, an owner may create a file utilizing user station 110. The group manager module 115 may be configured to detect the file creation command from the application 112 to the operating system 114. The operating system may assign a set of default attributes to the newly created file based on the attributes of the file owner. The group manager module 115 may be also configured to search a file encryption group table to search for a corresponding cryptographic key based on the set of default attributes. If the corresponding cryptographic key (e.g., a symmetric key, an asymmetric read/write key pair, etc.) is found (and thereby associating the file with an associated file encryption group), the group manager module 115 may be further configured to encrypt the file with the corresponding cryptographic key of the selected file encryption group and forward the encrypted data for storage in the shared file system 130 (or other memory devices local or remote).

In accordance with another aspect of the present invention, an owner may modify attributes (e.g., UNIX file permissions: group-read/write/executable bits, user—read/ write/executable bits, and owner-read/write/executable bits) of a selected file. Alternatively, for a system using access control lists (ACLs) such as the Andrew File System (AFS), the owner may modify an associated ACL for the selected file.

The group manager module 115 may be configured to determine whether the changed attributes may be associated with an existing file encryption group. If an existing file encryption group exists, the group manager module may be also configured to retrieve the corresponding write key for the existing file encryption group as well as the corresponding read key for the current file encryption group of the file. The group manager module may be further configured to decrypt the encrypted file with the read key and re-encrypt the file with the corresponding write key of the existing file encryption group.

Subsequently, the group manager module may update the file encryption group table. In one contemplated embodiment, the group manager module may be configured to maintain the file encryption group table on the user station 110. The group manager module 115 may refer to the file encryption group table to determine which the association between encryption keys and file encryption groups. In another contemplated embodiment, the group manager module may be configured to maintain the file encryption group table in a central location such as the group database server 150. The group database server 150 may be configured to provide a central location for all users of the system 100 to determine which file encryption group a particular file belongs.

Figure 2:
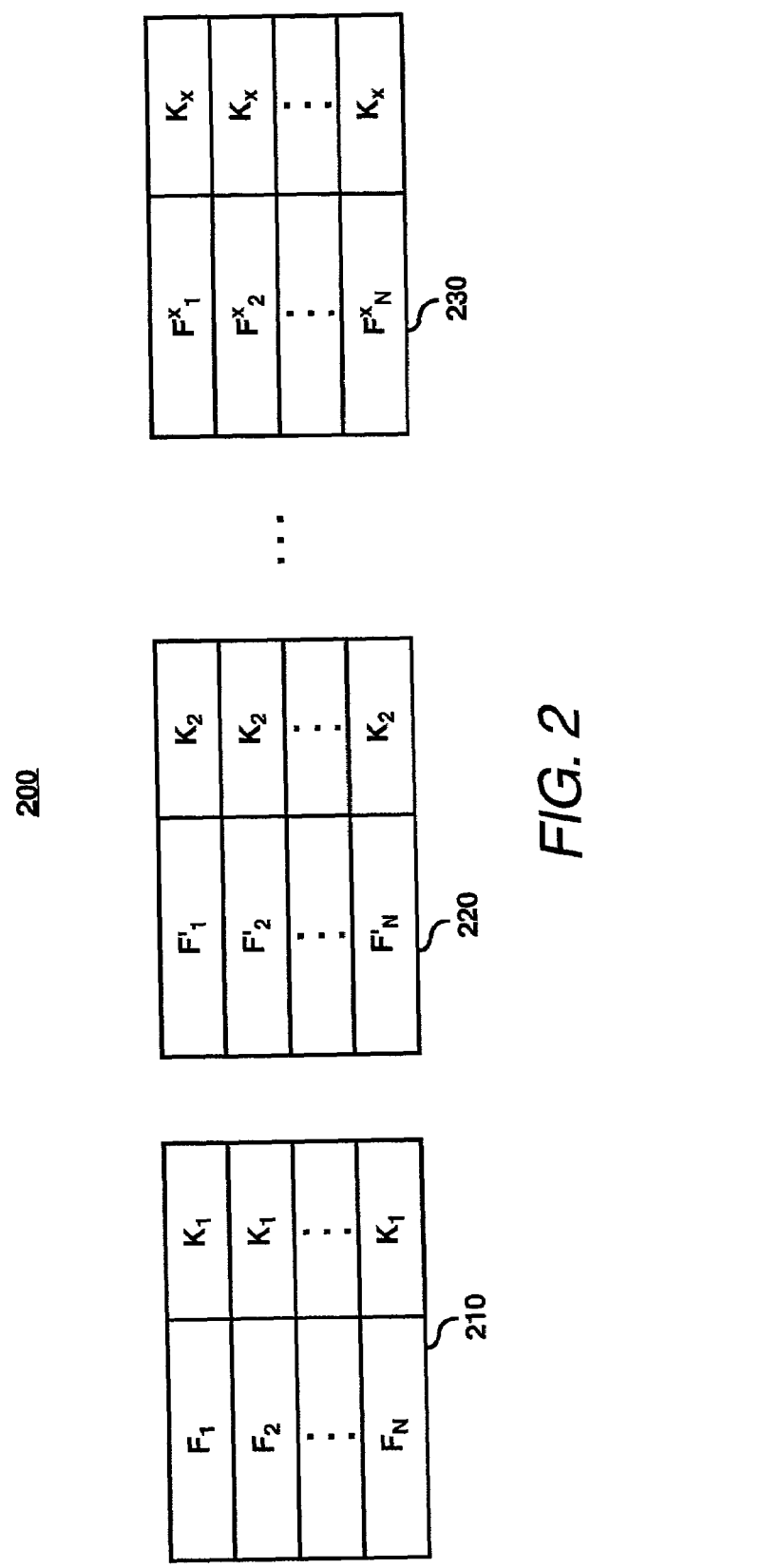
FIG. 2 illustrates an exemplary diagram of a file structure organized by the group manager module shown in FIG. 1 in accordance with an embodiment of the present invention.

FIG. 2 illustrates an exemplary diagram of a file structure 200 organized by the group manager module shown in FIG. 1 in accordance with an embodiment of the present invention. As shown in FIG. 2, a file encryption group 210 may include a plurality of files $F_1 \ldots F_N$, where each file has been encrypted with the same key, $K_1$. A file encryption group 220 may comprise a plurality of files $F'_1 \ldots F'_N$ where each file has been encrypted with the key, K2 as well as file encryption group 230 may contain a plurality of files $F^x_1 \ldots F^x N$, where each file has been encrypted with the key, $K_x$.

Each file encryption group, 210–230 may include a variety of files created by various owners of files. Each file is placed into their respective file encryption group, 210–230, based on the attributes of each file. Access may be granted to each file encryption group, 210–230, based on the possession of the respective key of each of the file encryption groups 210–230. File owners may affect a file membership into file encryption groups 210–230 by modifying the attributes of a selected file.

Figure 3:
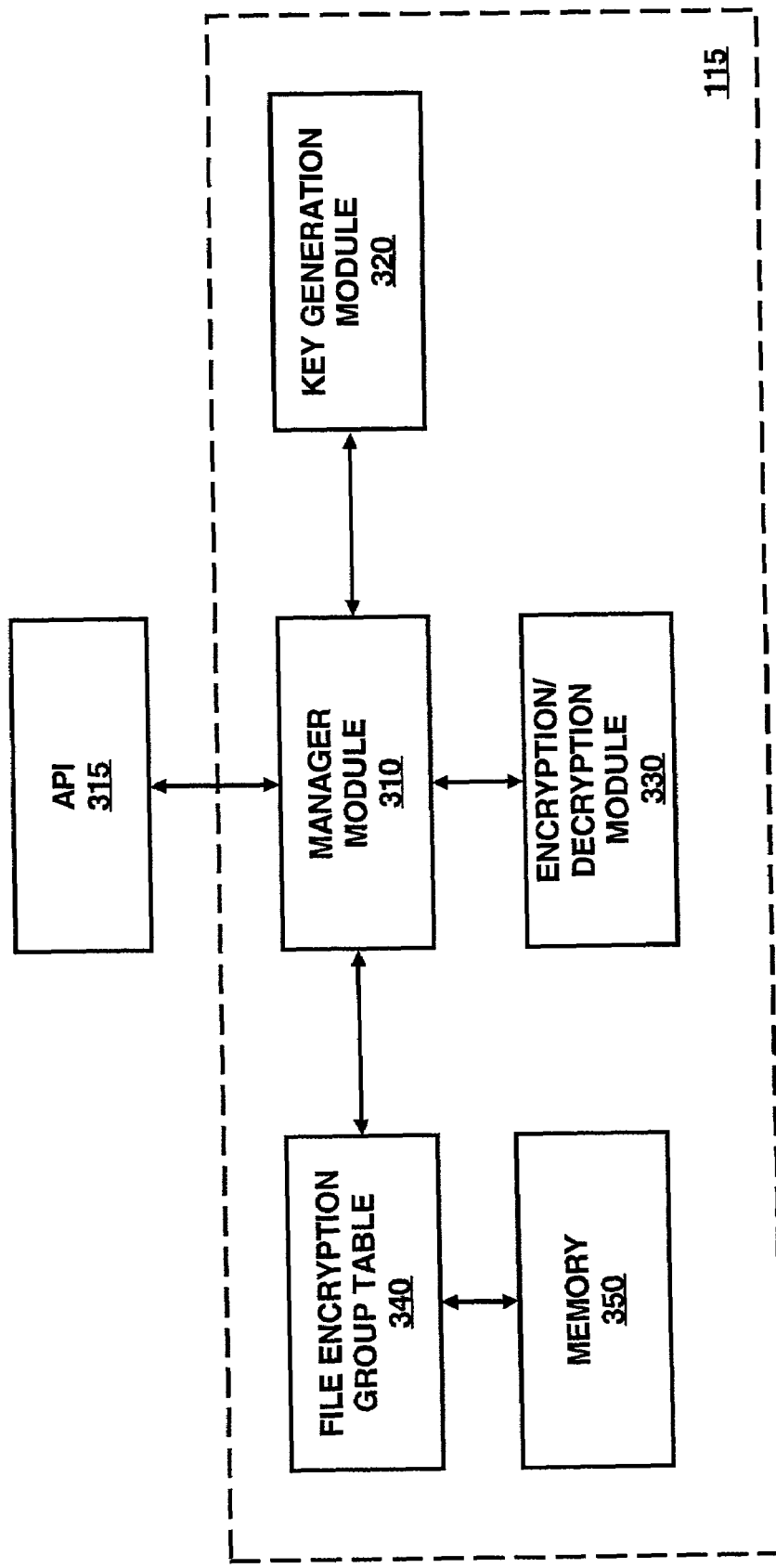
FIG. 3 illustrates a diagram of an exemplary architecture of the group manager module shown in FIG. 1 in accordance with an embodiment of the present invention.

FIG. 3 illustrates a diagram of an exemplary architecture of the group manager module 115 shown in FIG. 1 in accordance with an embodiment of the present invention. Although, for illustrative purposes only, FIG. 3 illustrates an exemplary embodiment of the group manager module 115, it should be readily apparent to those of ordinary skill in the art that FIG. 3 represents a generalized schematic illustration of the group manager module 115 and that other components may be added or existing components may be removed without departing from the spirit or scope of the present invention. Moreover, since FIG. 3 illustrates an exemplary embodiment of the group manager module 115, where the group manager module 115 may be implemented as a hardware embodiment, a software embodiment, and/or combination thereof and such embodiments are well within the scope and spirit of the present invention.

As shown in FIG. 3, the group manager module 115 includes a manager module 310, a key generation module 320, and an encryption/decryption module 330. The manager module 310 may be configured to provide management functions for the group manager module 115. For example, the manager module 310 may be configured to detect a file creation event and/or an attribute-changing event by monitoring an API 315 between the application 112 and the operating system. The manager module 115 may be also configured to determine which file encryption group a file belongs in response to a file attribute change event. Further details of the functionality of the manager module 115 may be explained in fuller detail herein below in conjunction with FIGS. 4 and 5.

The manager module 310 may be further configured to interface with the key generation module 320. The key generation module 320 may be configured to generate single keys or read/write key pairs for a new file encryption group. The key generation module 320 may crate randomly-generated keys for use in symmetric cryptographic algorithms such as DES, AES, etc., or key pairs via asymmetric cryptographic algorithms such as RSA, El-Gamal, McEliece, etc.

The manager module 310 may be further configured to interface with the encryption/decryption module 330. The encryption/decryption module 330 may be configured to provide encryption and decryption services to the group manager module 115. In particular, the encryption/decryption module 330 may encode files belonging to a particular file encryption group with the appropriate encryption (e.g., a write) key. The encryption/decryption module 330 may also decode the encrypted files with a complementary decryption (or read key) for an authorized viewer to access the file.

The manager module 310 may be further configured to interface with an optional file 20 encryption group table 340. In one contemplated embodiment, the file encryption group table 340 may be configured to provide a listing of encryption keys and their associated file encryption groups. The file encryption group table 340 may be implemented as a table, a linked-list or other similar indexing tool. The manager module 310 may search the file encryption group table 340 in order to determine if a file encryption group has an existing encryption key. In another contemplated embodiment, the file encryption group table 340 may be optionally located in a central location such as the group database server 150 (shown in FIG. 1). The manager module 310 may communicate with the group database server 150 for a determination of an existing file encryption group for the file over the network 130 utilizing network communication protocols such as Ethernet, local area network, TCP/IP, etc.

The file encryption group table 340 may be implemented with a memory such as dynamic random access memory, flash memory or other non-permanent memories. The file encryption group table 340 may be optionally configured with a memory access device such as a floppy disk drive, smart card, a memory stick or other similar memories. In this manner, the file encryption group table 340 may be stored on the medium of the memory device 350. Subsequently, the medium may be stored in a secure location (e.g., a vault or locked desk drawer).

Figure 4:
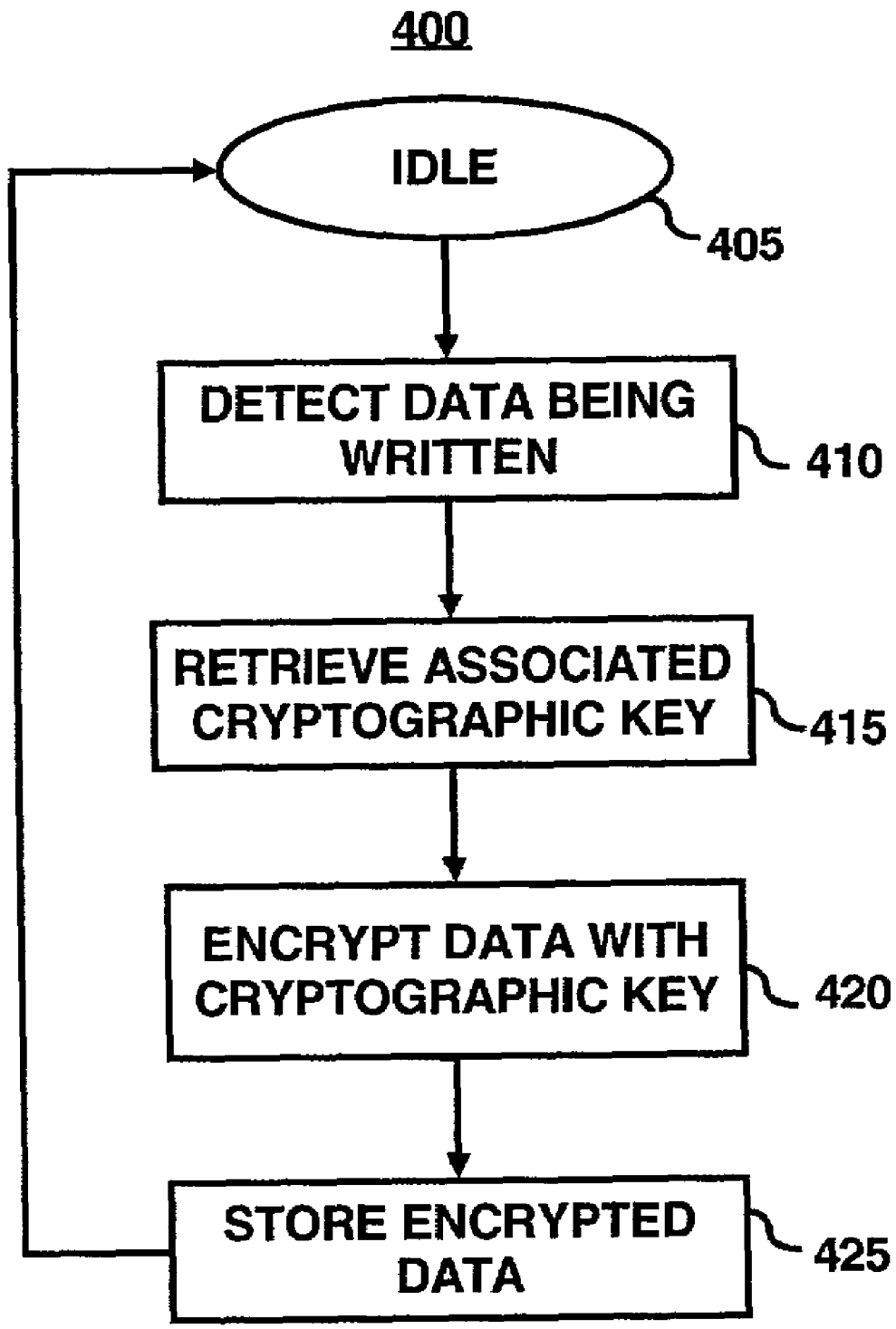
FIG. 4 illustrates an exemplary flow diagram for an operational mode of the group manager module shown in FIGS. 1 and 3 in accordance with an embodiment of the present invention.

FIG. 4 illustrates an exemplary flow diagram for an operational mode of the group manager module shown in FIGS. 1 and 3 in accordance with an embodiment of the present invention. Although, for illustrative purposes only, FIG. 4 illustrates a flow diagram for the group manager module 115 with the following steps, it should be readily apparent to those of ordinary skill in the art that FIG. 4 represents a generalized illustration of an embodiment of the group manager module 115 and that other steps may be added or existing steps may be removed without departing from the spirit or scope of the present invention.

As shown in FIG. 4, in step 405, the manager module 115 of the group manager module 115 may be configured to be in idle state monitoring the API interface 315. In step 410, the manager module 310 may detect a data being written, i.e., a file being created. The operating system 114 may be configured to assign a set of default attributes based on the attributes of the file owner.

In step 415, the manager module 310 may be configured to retrieve a cryptographic key based on the set of default attributes. In particular, the manager module 310 may search the file encryption group table for the associated cryptographic key (e.g., a symmetric key, an asymmetric read/write key pair, etc.) for the file encryption group 340 that is defined by the set of default attributes. Typically, the file owner may supply the associated cryptographic key when the file owner's user account was created. Accordingly, the newly created file may be associated with a file encryption group that may define by the set of default attributes of the file owner.

In step 420, the manager module 310 may be configured to forward the associated cryptographic key and the newly created file to the encryption/decryption module 330. The encryption/decryption module 330 may be configured to encrypt the newly created file with the associated cryptographic key.

In step 425, the manager module 310 may be configured to forward the encrypted file to the operating system 114 for storage. In step 430, the manager module 310 may be configured to post-process the associated cryptographic key. Subsequently, the manager module 310 may be configured to return to the idle state of 405.

Figure 5:
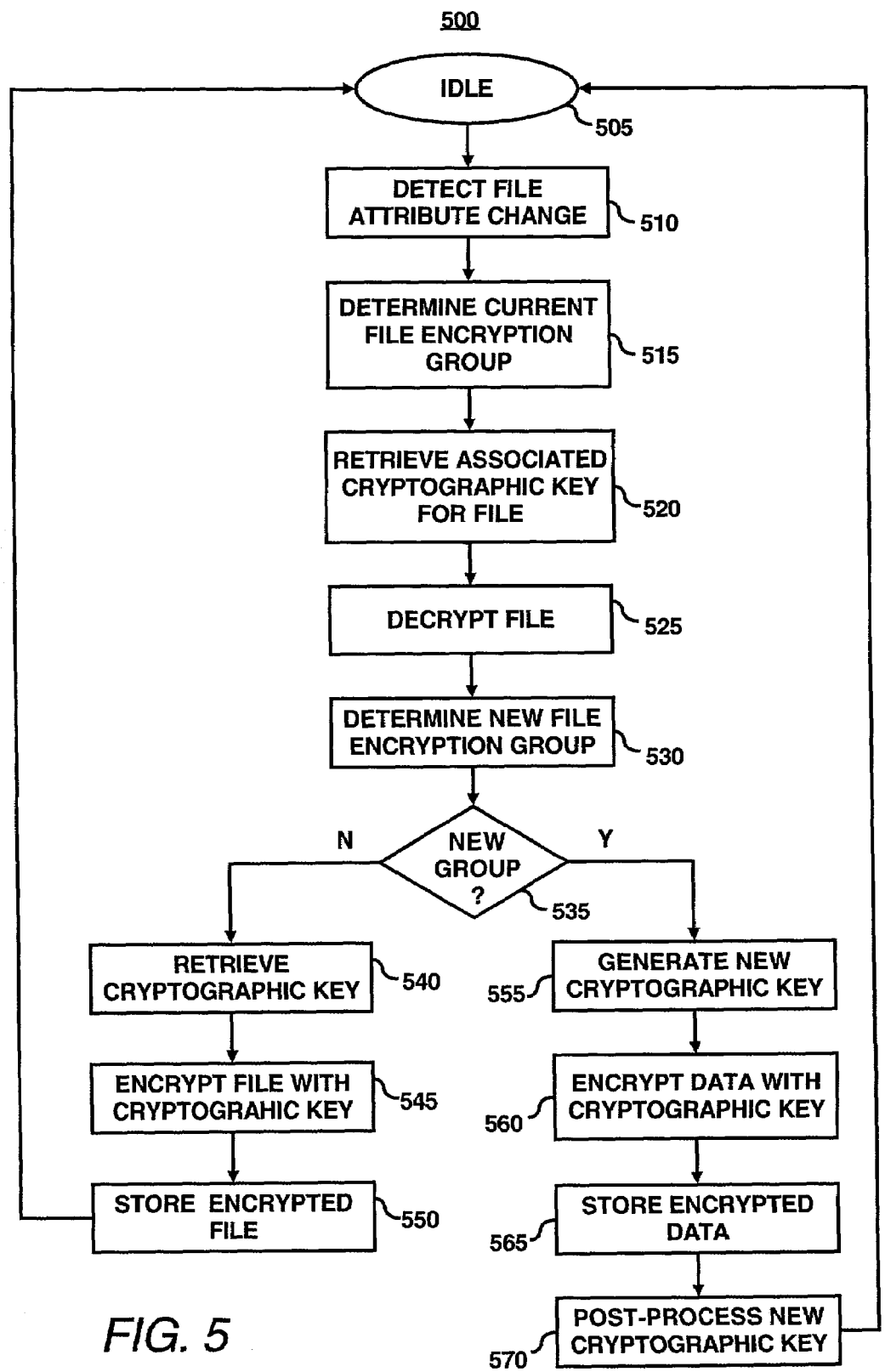
FIG. 5 illustrates an exemplary flow diagram for a second operational mode of the group manager module shown in FIGS. 1 and 3 in accordance with an embodiment of the present invention.

FIG. 5 illustrates an exemplary flow diagram for a second operational mode of the group manager module 115 shown in FIGS. 1 and 3 in accordance with an embodiment of the present invention. Although, for illustrative purposes only, FIG. 5 illustrates a flow diagram for the group manager module 115 with the following steps, it should be readily apparent to those of ordinary skill in the art that FIG. 5 represents a generalized illustration of an embodiment of the group manager module 115 and that other steps may be added or existing steps may be removed or modified without departing from the spirit or scope of the present invention.

As shown in FIG. 5, in step 505, the manager module 310 of the group manager module 115 may be configured to be an idle state. The manager module 310 may monitor the message traffic between the application 112 and the operating system 114 by utilizing the API 315.

In step 510, the manager module 310 may be configured to detect an attribute change in a file (e.g., an owner/user has modified the group read permission for the file). The manager module 310 may be also configured to determine the current file encryption group that the file belongs, in step 515. In particular, the manager module 310 may retrieve the current attributes of the file and use the current attributes as an index into the file encryption group table 340 to retrieve the associated cryptographic key (e.g., a symmetric key, a read key of an asymmetric read/write key pair, etc.) for the selected file in step 520.

In step 525, the manager module 310 may be configured to forward the associated cryptographic key and the selected encrypted file to the encryption/decryption module 330, which decrypts the selected encrypted file with the associated cryptographic key.

In step 530, the manager module 310 may be configured to determine whether the changed attributes belong to a new file encryption group by utilizing the changed attributes as index into the file encryption group table 340. If, in step 535, the changed attributes indicate an existing file encryption group, the manager module 310 may be further configured to retrieve the cryptographic key of the existing file encryption group from the file encryption group table 340, in step 540. The manager module 310 may be yet further configured to encrypt the file with the retrieved cryptographic key of the existing file encryption group, in step 545 and store the encrypted file in the shared file system 130, in step 550.

Returning to step 535, if the manager module 310 determines that the changed attributed indicate a new group, the manager module 310 may initiate a new cryptographic key (e.g., a symmetric key, an asymmetric read/write key pair, etc.) generation from the key generation module 320, in step 555.

In step 560, the manager module 310 may be configured to forward the newly generated cryptographic key and the file to the encryption/decryption module 330, which encrypts the file with the new cryptographic key. In step 565, the manager module 310 may be also configured to forward the encrypted file to the operating system 114 for storage on the shared file system 130.

In step 570, the manager module 310 may be configured to post process the new cryptographic key. In particular, the manager module 310 may update the file encryption group table 340 with the new cryptographic key and the associated file encryption group. The manager module 310 may also store the respective cryptographic key in the file encryption group table 340.

It is contemplated that the file encryption group table 340 may be implemented with the group manager module 115 on a user station 110. However, it is also contemplated that the file encryption group 340 may be also implemented in a central location of the system 100 such as a group database server 150.

Figure 6:
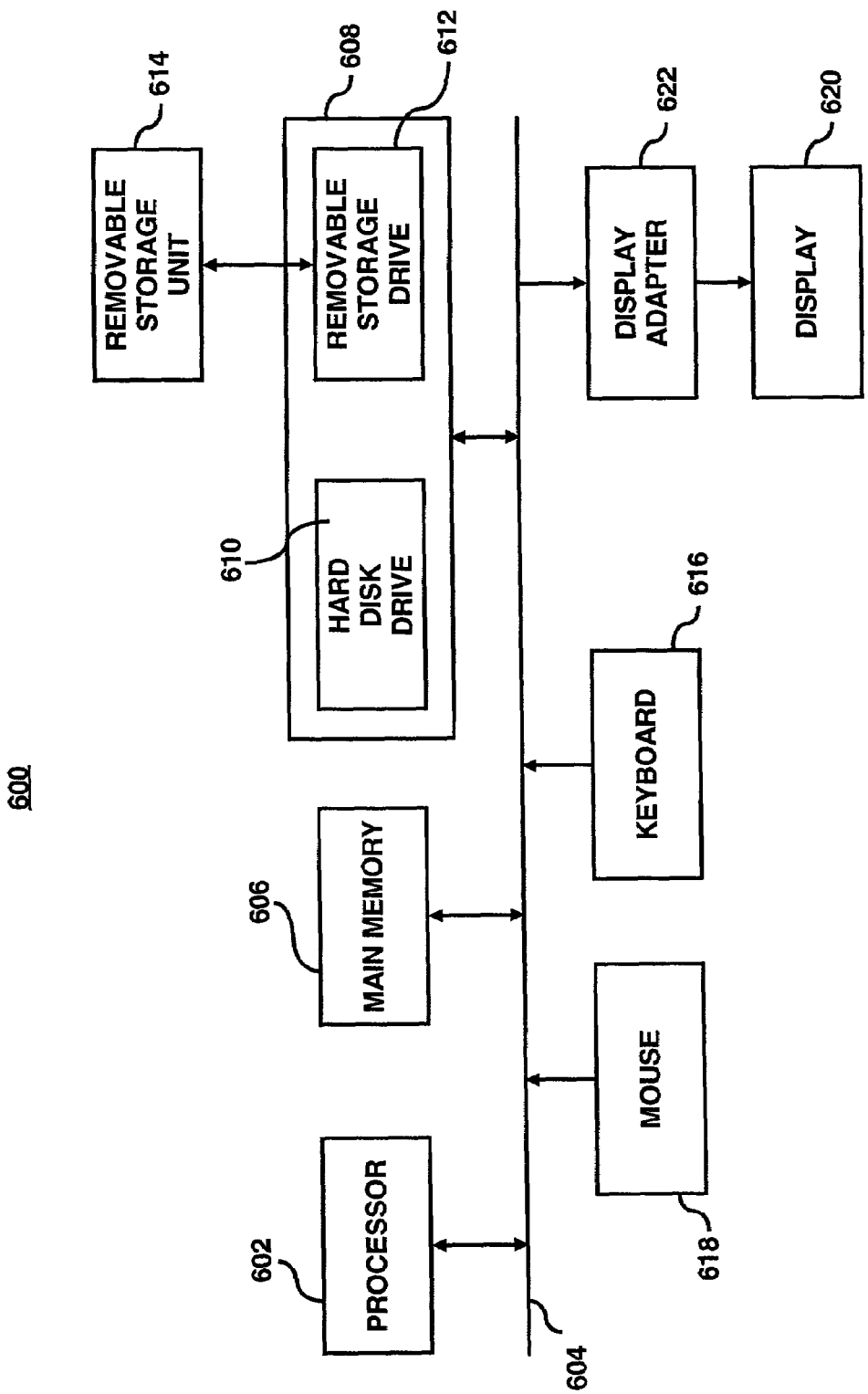
FIG. 6 illustrates an exemplary block diagram of a computer system where an embodiment of the present invention may be practiced.

FIG. 6 illustrates an exemplary block diagram of a computer platform 600 where an embodiment of the present invention may be practiced. As shown in FIG. 6, the computing platform 600 includes one or more processors, such as processor 602 that provides an execution platform for the group manager module 115. Commands and data from the processor 602 are communicated over a communication bus 604. The computing platform 600 also includes a main memory 606, preferably Random Access Memory (RAM), where the software for the group manager module 115 may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of software for the security module 115 may be stored. The removable storage drive 612 reads from and/or writes to a removable storage unit 614 in a well-known manner. A user interfaces with the group manager module 115 with a keyboard 616, a mouse 618, and a display 620. The display adaptor 622 interfaces with the communication bus 604 to receive display data from the processor 602 and converts the display data into display commands for the display 620.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of implementing a file system, comprising:
   creating a plurality of file encryption groups from a plurality of files stored in the file system based on common attributes of said plurality of files, wherein at least one of the file encryption groups includes multiple files stored in the file system;
   associating each file encryption group of said plurality of file encryption groups with a respective key;
   accessing one of the file encryption groups by utilizing one of the respective keys that is associated with the one file encryption group;
   determining a modification in at least one attribute of a plurality of attributes for a file of the plurality of files;
   utilizing the plurality of attributes for the file for indexing into a file encryption group table storing attributes for each of the plurality of file encryption groups;
   determining whether an existing file encryption group of the plurality of file encryption groups has attributes matching the plurality of attribute for the file based on the indexing;
   in response to determining a non-existence of an existing file encryption group having attributes matching the plurality of attributes for the file,
      generating a new file encryption group having attributes matching the plurality of attributes for the file;
      including said file in the new file encryption group;
      generating a read/write key pair for the new file encryption group;
      encrypting said file with the write key of the read/write key pair generated for the new file encryption groups;
      updating the table with said write key of the read/write key pair generated for the new file encryption group;
   in response to determining an existence of an existing file encryption group having attributes match the plurality of attributes for the file,
      including said file in the existing file encryption group having the attributes matching the plurality of attributes for the file;
      encrypting said file with the write key of the read/write key pair for the existing file encryption group having the attributes matching the plurality of attributes for the file; and
      updating the table with the modification in the at least one attribute of the plurality of attributes for the file of the plurality of files.

2. The method according to claim 1, further comprising:
   encrypting each file in each file encryption group of said plurality of file encryption groups with said respective key;
   storing said encrypted files of said plurality of file encryption groups; and
   accessing said encrypted files from said one file encryption group by utilizing said respective key.

3. The method according to claim 1, further comprising:
   detecting a creation of a new file;
   encrypting said new file with a default write key; and
   associating said new file with a default file encryption group.

4. The method according to claim 3, wherein said default file encryption group is based on an owner file permissions.

5. The method according to claim 1, further comprising:
   determining a modification in at least one attribute of a file;
   searching for an existing file encryption group of said plurality of file encryption groups based on said at least one attribute of said file; and
   associating said file with said existing file encryption group of said plurality of file encryption groups.

6. The method according to claim 5, wherein said association further comprises:
   retrieving a write key for said existing file encryption group in response to said determination of existence of said existing file encryption group; retrieving a read key for a current file encryption group of said file; decrypting said file with said read key; and encrypting said decrypted file with said write key.

7. The method according to claim 5, wherein said search further comprises:
   searching a table by using said at least one attribute of said file as a search index.

8. The method according to claim 1, wherein said attributes includes at least one of the owner, the group, a group read bit, a group write bit, a group execute bit, an owner read bit, an owner write bit, an owner execute bit, user read bit, user write bit and user execute bit.

9. A system for implementing a file system, comprising:
   at least one processor;
   a memory coupled to said at least one processor; and
   a group manager module residing in said memory and executed by said at least one processor, wherein said group manager module is configured to create a plurality of file encryption groups from a plurality of flies stored in the file system based on common attributes of said plurality of files, wherein at least one of the file encryption groups includes multiple files stored in the file system, is also configured to associate each file encryption group of said plurality of file encryption groups with a respective key, and is further configured to access one of the file encryption groups by utilizing one of the respective keys that is associated with the one file encryption group;
   wherein said group manager module is further configured to determine a modification in at least one of the common attributes of a file of the plurality of files, wherein the at least one of the common attributes of the file was previously used by the group manger to determine which of the file encryption groups the file belongs to, is yet further configured to search for an existing file encryption group of said plurality of file encryption groups within a file encryption group table storing attributes for each of the plurality of file encryption groups using the modification in the at least one of the common attributes of said file, and
   determine whether an existing file encryption group of the plurality of file encryption groups has attributes matching the modification in the at least one of the common attributes of said file based on the search, and
   in response to determining a non-existence of an existing file encryption group having attributes matching the modification in the at least one of the common attributes said file, the module configured to,
      generate a new file encryption group having attributes matching the modification in the at least one of the common attributes of said file,
      include said file in the new file encryption group, generate a read/write key pair for the new file encryption group, encrypt said file with the write key of the read/write key pair generated for the new file encryption group, and update the table with said write key of the read/write key pair generated for the new file encryption group; and in response to determining an existence of an existing file encryption group having attributes matching the modification in the at least one of the common attributes of said file, the module configured to, include said file in the existing file encryption group having the attributes matching the modification in the at least one of the common attributes of said file, encrypt said file with the write key of the read/write key pair for the existing file encryption group having the attributes matching the modification in the at least one of the common attributes of said file, and update the table with the modification in the at least one of the common attributes of the files.

10. The system according to claim 9, wherein said group manager is further configured to encrypt each file in each file encryption group of said plurality of file encryption groups with said respective key, is yet further configured to store said encrypted files of said plurality of file encryption groups and is yet further configured to access said encrypted files from said one file encryption group by utilizing said respective key.

11. The system according to claim 9, wherein said group manager module is further configured to detect a creation of a new file, is yet further configured to encrypt said new file with a default write key, and is yet further configured to associate said new file with a default file encryption group.

12. The system according to claim 9, wherein said group manager module is further configured to retrieve a write key for said existing file encryption group in response to said determination of existence of said existing file encryption group, is yet further configured to retrieve a read key for a current file encryption group of said file, is yet further configured to decrypt said file with said read key, and is yet further configured to encrypt said decrypted file with said write key.

13. An apparatus for implementing a file system, comprising:

an interface configured to communicate with a storage device;

an encryption/decryption module; and a manager module configured to associate multiple files of a plurality of files stored on said storage device into a file group based on a common attributes of a plurality of attributes of said multiple files and encrypting said multiple files with one encryption key of a plurality of encryption keys by utilizing said encryption/decryption module to create a file encryption group and wherein the manager module is further configured to, determine a modification in at least one attribute of the plurality of attributes for a file of the plurality of files;

utilize the plurality of attributes for the file for indexing into a file encryption group table storing attributes for each of plurality of file encryption groups;

determine whether an existing file encryption group of the plurality of file encryption groups has attributes matching the plurality of attributes for the file based on the indexing; and in response to determining a non-existence of an existing file encryption group having attributes matching the plurality of attributes for the file, the module configured to, generate a new file encryption group having attributes matching the plurality of attributes for the file;

including said file in the new file encryption group;

generate a read/write key pair for the new file encryption group;

encrypt said file with the write key of the read/write key pair generated for the new file encryption group;

update the table with said write key of the read/write key pair generated for the new file encryption group; and in response to determining an existence of an existing file encryption group having attributes matching the plurality of attributes for the file, the module configured to, include said file in the existing file encryption group having the attributes matching the plurality of attributes for the file;

encrypt said file with the write key of the read/write key pair for the existing file encryption group having the attributes matching the plurality of attributes for the file; and update the table with the modification in the at least one attribute of the plurality of attributes for the file of the plurality of files.

14. The apparatus according to claim 13, further comprising:

a key generation module configured to generate an encryption/decryption key pair in response to a determination of a new file group status, wherein said manager module is also configured to request said encryption/decryption pair in response to a determination of a modification of attributes of said file indicating a new file group.

15. The apparatus according to claim 14, further comprising:

a file group table configured to maintain a listing of a plurality of encryption keys and associated file groups, wherein said manager module is further configured to update said file group table with said new file group in response to said determination of said modification of attribute of said file indicating said new file group.

16. The apparatus according to claim 13, further comprising:

a file group table configured to maintain a listing of a plurality of encryption keys and associated file groups, wherein said manager module is further configured to search said file group table for an existing file group in response to a modification of attributes of a file.

17. The method of claim 1, wherein creating a plurality of file encryption groups from a plurality of files stored in the file system based on common attributes of said plurality of files further comprises:

determining a set of common attributes for each file encryption group;

identifying files of the plurality of files stored in the file system including the set of common attributes for a respective file encryption group; and including the files stored in the file system having the set of common attributes in the respective file encryption group.

* * * * *

UNITED STATES PATENT AND TRADEMARK OFFICE
CERTIFICATE OF CORRECTION

PATENT NO. : 7,171,557 B2
APPLICATION NO. : 09/984928
DATED : January 30, 2007
INVENTOR(S) : Mahesh Kallahalla et al.

It is certified that error appears in the above-identified patent and that said Letters Patent is hereby corrected as shown below:

In column 3, line 50, delete ""user group rw-r-r-"" and insert -- "user group1 rw-r-r-" --, therefor.

In column 7, line 12, delete "$F^x_1...F^xN$" and insert -- $F^x_1...F^x_N$ --, therefor.

In column 8, line 7, delete "20" before "encryption".

In column 11, line 26, in Claim 1, delete "attribute" and insert -- attributes --, therefor.

In column 11, line 39, in Claim 1, delete "groups" and insert -- group --, therefor.

In column 11, line 43, in Claim 1, delete "match" and insert -- matching --, therefor.

In column 12, line 27, in Claim 8, after "write bit" insert -- , --.

In column 12, line 34, in Claim 9, delete "flies" and insert -- files --, therefor.

In column 12, line 55, in Claim 9, after "file," delete "and".

In column 12, line 63, in Claim 9, after "attributes" insert -- of --.

In column 13, line 52, in Claim 13, delete "attributes" and insert -- attribute --, therefor.

In column 13, line 56, in Claim 13, after "group" insert -- , --.

Signed and Sealed this

Twenty-seventh Day of January, 2009

JOHN DOLL
*Acting Director of the United States Patent and Trademark Office*